United States Patent [19]

Moore

[11] 4,154,627
[45] May 15, 1979

[54] TORCH TRAVERSING METHOD

[75] Inventor: Arthur I. W. Moore, Melton Mowbray, England

[73] Assignee: The Production Engineering Research Association of Great Britain, Melton Mowbray, England

[21] Appl. No.: 885,202

[22] Filed: Mar. 10, 1978

[51] Int. Cl.² ........................... B23K 7/06; B23K 7/08
[52] U.S. Cl. ........................................ 148/9.5; 266/51
[58] Field of Search ........................... 148/9.5; 266/51

[56] References Cited
U.S. PATENT DOCUMENTS 2,735,796   2/1956   Kelley et al. ..................... 148/9.5

Primary Examiner—W. Stallard
Attorney, Agent, or Firm—Darby & Darby

[57] ABSTRACT

The invention describes a method of machining a workpiece with a cutting tool arrangement involving relative rectilinear movement between workpiece and tool, a heat source being mounted for transverse movement in a series of arcuate passes across the workpiece to heat and soften the portion thereof immediately ahead of the cutting tool. In examples given, the heat source is one or two plasma torches and the arcuate passes are part of an oscillatory or of a rotational movement.

15 Claims, 9 Drawing Figures

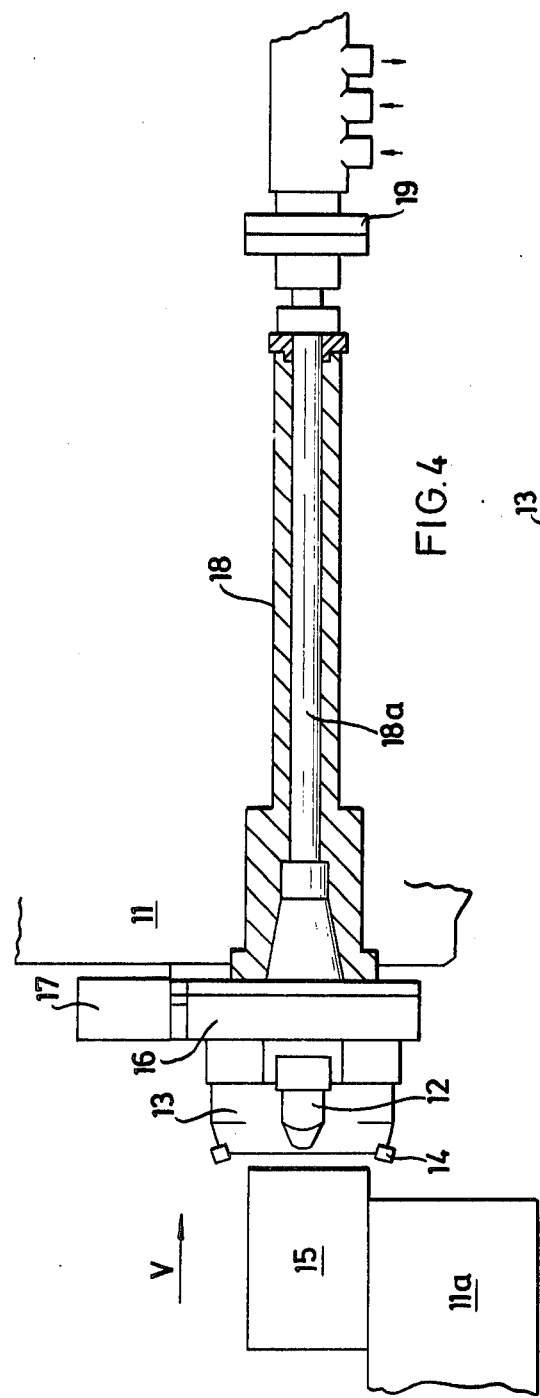

TORCH TRAVERSING METHOD

The present invention relates to machining and more particularly to a method of hot machining using a plasma torch, for example, as a heat source.

The term 'hot machining' as used herein refers to a method of machining workpieces in which heat from a heat source, for example a plasma torch, is applied to a workpiece to soften it and thus facilitate machining by a separate cutting tool, such as a turning tool in the case of a lathe.

It is known from the Applicants' prior U.K. Letter Pat. No. 1,351,140 to place a heat source in the form of a plasma torch ahead of a heat-resistant cutting tool, the plasma torch subjecting only the portion of the workpiece entering the cutting zone to heat so that the remainder of the workpiece remains thermally undamaged.

In general, where hot machining is applied to turning, the heat source is maintained in fixed relationship with respect to the turning tool. Difficulty arises when hot machining is applied to milling however because the cutting tool rotates. Thus some degree of relative movement between the heat source and the workpiece is necessary.

BRIEF SUMMARY OF THE INVENTION

In accordance with the present invention therefore there is provided a method of machining a workpiece with a cutting tool or tools which comprises creating relative rectilinear movement between the workpiece and heat supplying means, mounting the heat supplying means for movement in a series of arcuate or substantially arcuate passes transversely of the workpiece with reference to said relative rectilinear movement, the speed of said arcuate movements and the intensity of the heat source being so related to that of said relative rectilinear movement as to produce a substantially evenly heated and softened region of the workpiece in advance of the cutting tool or tools the or each of which is arranged to remove heated and softened workpiece material.

Also in accordance with the present invention there is provided a method of machining a workpiece with a cutting tool or tools which comprises creating relative rectilinear movement between the workpiece and a heat source, mounting the heat source for oscillatory movement transversely of the workpiece with reference to the direction of said relative rectilinear movement, the path of the heat source being curved and the speed of said oscillatory movement and the intensity of the heat source being so related to that of said rectilinear movement as to produce substantially even heating and softening of a region of the workpiece in advance of the cutting tool or tools the or each of which is arranged to remove heated and softened workpiece material.

The invention further provides a method of machining a workpiece with a cutting tool or tools which comprises creating relative rectilinear movement between the workpiece and a heat supplying means, mounting the heat supplying means for rotational movement in a path, a portion of which is arranged transversely of the workpiece with reference to the direction of said relative rectilinear movement, the path of the heat supplying means being circular or substantially circular and the speed of said rotational movement and the intensity of the heat source being so related to that of said rectilinear movement as to produce substantially even heating and softening of a region of the workpiece in advance of the cutting tool or tools the or each of which is arranged to remove heated and softened workpiece material.

Conveniently the method includes the step of clamping the workpiece to a movable bed of the machine for movement therewith and mounting the heat source solely for oscillatory or rotational movement across the workpiece.

Preferably the machine is a milling machine but a broaching, planing or caulking machine may also be used. Where a milling machine is used the cutting tool is the milling cutter or cutters carried by the milling head.

The heat supply means is conveniently at least one plasma torch. In one example, one torch may be mounted for arcuate oscillatory movement with respect to the direction of feed of the workpiece by means of a rack and pinion assembly. The plasma torch may be carried by the pinion which is itself mounted for oscillatory movement by the rack which is moved reciprocably by a double-acting pneumatic or hydraulic cylinder.

In other examples, one or more torches may be carried on a rotary plate for rotational movement about a centre axis of the cutting tool.

Whichever form of heat supply means is employed, the heat source is preferably traversed across the workpiece at a constant speed. In the case of oscillatory movement, this may be achieved by traversing the heat source beyond the edge of the workpiece prior to reversing the direction thereof.

Since the workpiece is substantially evenly heated to avoid thermal damage thereto, it is preferred that two successive passes of the heat source over the workpiece overlap. However, the degree of overlap between two successive passes should be such that substantially even heating results and the workpiece is not thermally damaged.

It will also be found convenient under certain circumstances to provide a leading edge of a workpiece with an additional sacrificial portion having a lesser degree of hardness than the main workpiece. This lessens the shock-loading on the cutting tool at the commencement of machining and also causes the pilot arc of the plasma torch to transfer to the sacrificial portion ahead of the main workpiece, thereby improving the heating and softening of the leading edge portions thereof.

Where the size of the cutting tool permits, reduction both in the risk of damage to the plasma torch and in the distance between plasma arc impingement and the actual cutting region, is achieved if the plasma torch is received in a recess in the body of the cutting tool.

BRIEF DESCRIPTION OF DRAWINGS

The invention will now be further described by way of example with reference to the accompanying drawings in which:

FIG. 4 is a diagrammatic side view, part in section, showing a second milling machine according to the invention.

FIG. 5 is an end view of the machine of FIG. 4 in the direction of arrow V.

FIGS. 6a and 6b show alternative arrangements of mounting the torch in the machine of FIG. 4.

DETAILED DESCRIPTION OF DRAWINGS

Figure 1:
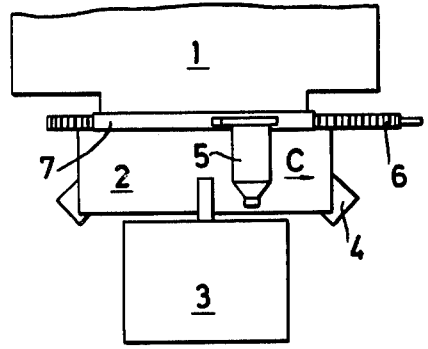
FIG. 1 is a general side elevational view of part of a vertical milling machine.

In FIG. 1 the machine head of a vertical milling machine is shown as 1. The machine head rotatably mounts a cutter body at a conventional, shallow angle to the horizontal for movement in the direction of the arrow 'C', the cutter body carrying one or more cutting inserts 4 in known manner. Although four cutting inserts 4 are shown in FIGS. 1 and 2 it will be appreciated that any number of such cutting tips may be used.

Figure 3:
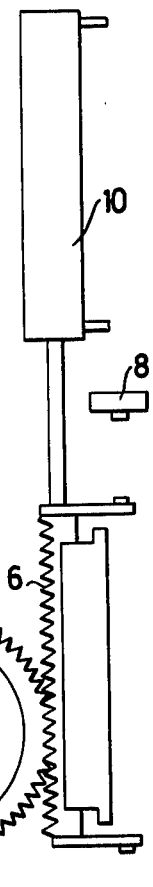
FIG. 3 is a diagrammatic illustration of the torch traverse mechanism as used in FIGS. 1 and 2.
Figure 2:
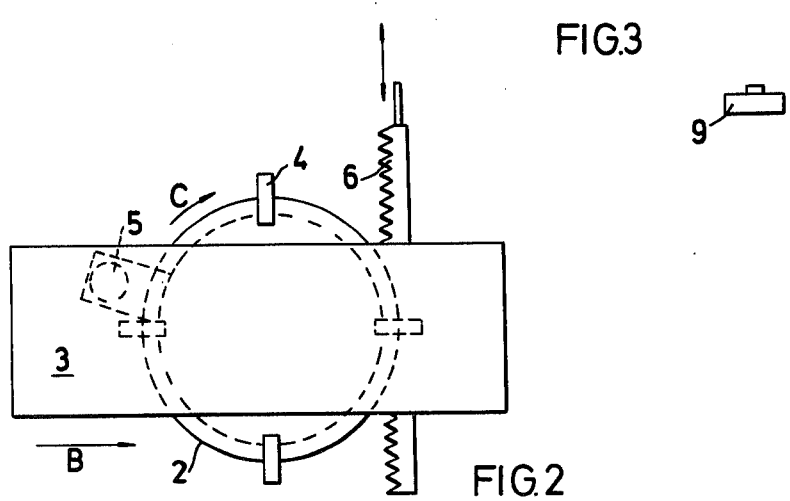
FIG. 2 is an underside plan view of the apparatus shown in FIG. 1.

A workpiece 3 is clamped on the milling machine carriage (not shown) in known manner for movement in the direction of the arrow 'B' in FIG. 2. The workpiece is connected electrically to the main circuit of the plasma arc. A plasma torch 5 is mounted for oscillatory movement by means of a rack and pinion mechanism located between the machine head and the cutter body 2 as may be seen in FIG. 2. The rack 6 of the mechanism is arranged to reciprocate between a pair of limit switches 8, 9 (FIG. 3) by means of a double-acting pneumatic or hydraulic cylinder 10. Movement of the rack 6 in turn causes the pinion 7, and hence the plasma torch, to traverse the workpice 3 in a series of arcuate angular passes.

It is preferred that the torch is arranged to travel at a constant speed as it passes over the workpiece 3. This is achieved by spacing the limit switches 8, 9 at a greater distance apart than the width of the workpiece 3 so that reversal of the direction of movement of the torch 5 occurs beyond the edge of the workpiece. In any event the speed of the oscillatory movement of the torch 5 is so related to the rate of feed of the workpiece as to substantially evenly heat the workpiece in advance of the cutting tips 4, if necessary by arranging for subsequent passes of the torch to overlap.

A workpiece 3 is clamped on the milling machine carriage (not shown) in known manner for movement in the direction of the arrow 'B' in FIG. 2. In use, the plasma torch 5 is energised with the torch lying displaced from the workpiece so that the resulting plasma arc is nontransferred (pilot arc). The machine is switched on so that the cutter body 2 rotates. The plasma torch is then caused to commence its oscillatory movement by activating the cylinder 10. As the torch 5 passes over the edge of the workpiece a transferred arc to the workpiece is automatically established. This is retained until the torch passes over the opposite edge of the workpiece when the torch again becomes non-transferred. It will be appreciated that movement of the table and the oscillatory movement are adjusted so that optimum heating takes place as the carriage moves towards the cutter.

The heat from the plasma torch is arranged to heat only those regions of the workpiece entering the cutting zone. Thereafter the cutting inserts in the cutting tool remove the heated and therefore softened portions of the workpiece in the manner previously proposed by the Applicants.

The torch traverse rate is adjusted according to the table traverse rate of the milling machine so that the arcuate bands produced by the plasma torch overlap. It has been found satisfactory if successive traverses of the heat source are spaced apart not more than 100 percent of the effective width of the heat source. To allow heat to penetrate into the depth of cut of the cutting inserts 4, the torch applies heat ahead of the milling cutter, the distance measured along a radius from the cutting tips to the arc axis being referred to as the 'lead'. Preferably the torch is mounted in advance of the cutting tips by a distance of up to twice the diameter of the plasma torch nozzle orifice, although up to six times may be permissible under certain circumstances. Whilst the machining apparatus has been described as a milling machine it will be understood that this term is to be construed generically as including milling machines capable of, for example, face milling, end milling, side milling and slab milling.

Moreover whilst in the described embodiment the workpiece is clamped on a milling machine carriage it will be appreciated that where, for example, the workpiece is of sufficient size, the workpiece may remain stationary and the cutting tool and heat source moved relatively thereto. In addition to the relative movement, the heat source will also be oscillated about the direction of the relative movement.

Whereas in the above described embodiment of the invention the heat source is mounted for arcuate oscillatory movement transversely of the workpiece, it is to be understood that the heat source could be mounted for movement in a series of arcuate passes in the same direction across the workpiece.

FIGS. 4 and 5 show a further milling machine 11 set up for a face milling operation in which heat supply means are passed in an arcuate path across a workpiece. In this example the arcuate path is part of a circular path described by two plasma arc torches 12 mounted for rotation with a cutting tool head 13 having four cutters 14.

A workpiece 15 is clamped on the milling machine carriage 11a in known manner and the torches are operated with the same requirements in mind as already explained above.

In a rotational torch mode, the torch or torches will preferably rotate at the same speed as the cutter, the table traverse rate of the milling machine being adjusted so that the arcuate bands produced by the plasma torch overlap. It has been found with milling cutters of small diameter, say, up to 4 inches, that a single torch produces the right amount of overlap. With longer cutters the use of two or more torches is preferable, the number increasing as the diameter of the cutter increases, so as to space apart successive heated traverses not more than 100 percent of the width of the heat source. In the present example, the use of two torches is shown.

The cutting head 13 is mounted for rotation on a slipring 16 and power for the heat source is supplied through a brush gear device 17. The conventional drawbolt which passes through the spindle 18 of a milling machine is, in the present example, replaced by a hollow distributor tube 18a comprising three tubes (not illustrated in detail) for supplying the services (gas, cooling water and heated return water) to the plasma torch or torches through a rotary union 19. The tube 18a also functions as a drawbolt in the usual manner.

The rotary union 19 performs not only the function of providing the services but only ensures that the power to the heating source is only supplied as the appropriate torch traverses the arcuate pass across the workpiece and not during the remainder of the rotational movement. Where the number of torches is low, say two or three, each torch will be supplied in turn, but where this number increases, say to six, it is possible that there will be perhaps two torches in the course of traversing the workpiece at a given moment. It would then be impracticable to divide a single power source between the torches, and it is probable that a separate power source would have to be provided for each torch.

FIG. 6a shows an arrangement of torch mounting in which there is a considerable distance between the plasma impingement point 20 and the cutters 14. As can be seen from FIG. 6b this distance may be considerably reduced by forming a recess 21 in the cutter head 13 to accommodate a torch 12a.

Figure 7:
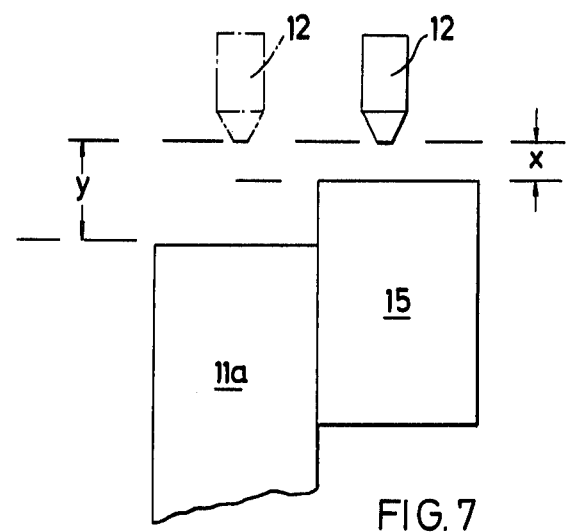
FIG. 7 is a diagrammatic illustration of a power cut-off arrangement.

In FIG. 7, it will be observed that a stand-off distance x is provided between the torch 12 and the workpiece 15, which, in practice, is small enough to ensure consistent striking of the main arc onto the workpiece. However, when the trailing end of the workpiece is reached and the torch traverse path extends beyond the workpiece, there is arranged to be a marked increase in stand-off distance to a distance y. This sudden increase is sensed by the power unit and the power to the heat source is automatically cut off, although the pilot arc remains active.

Figure 8:
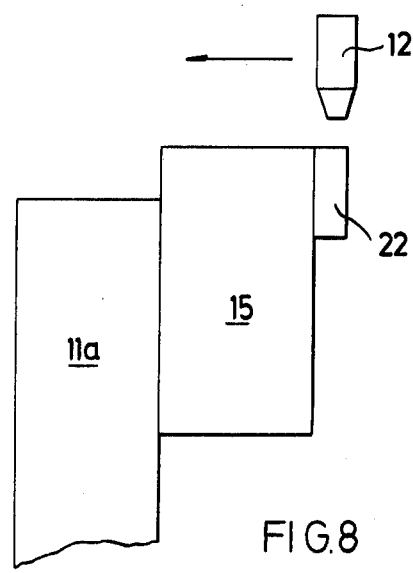
FIG. 8 shows a sacrificial workpiece portion.

FIG. 8 shows the workpiece 15 provided with a mild steel bar 22 secured to its leading edge so as to lie flush with the surface to be milled. The plasma torch 12 therefore traverses the bar 22 before it reaches the main workpiece. This causes the main transferred arc to become established and to commence heating the bar. Thus the heating operation has already begun ahead of the main workpiece and a more even heating effect is obtained. Moreover, because the bar is chosen to be of softer metal than the workpiece, the shock loading on the cutting tool is reduced.

The following test results were obtained in experiments designed to contrast the method of hot machining in accordance with the invention with conventional machining.

In carrying out the method using an oscillatory movement, the workpiece was heated with a constricted-arc plasma torch used in conjunction with a 300 amp transformer-rectifier power unit having an open circuit voltage of 80 volts and a dropping power characteristic. A single stream of argon gas was passed through a nozzle attached to the torch body at rates of up to 9.5 liters per minute. The plasma nozzle orifice had a diameter in the region of 3/16 inch. It will be understood that the gas may be a commercial grade inert gas, argon or helium, or may include proportions of other suitable gases, e.g. hydrogen or mitrogen.

The workpiece was mounted and clamped to the table of a horizontal milling machine, and the torch was set to oscillate across the workpiece close to the periphery of a 3-tooth face milling cutter of approximately 6½ inch diameter and mounted on the horizontal spindle of the milling machine. The heated material was removed by the cutting inserts mounted in the milling cutter body.

The torch was operated in the transferred-arc mode, provision being made to complete the current circuit through the workpiece and machine table. The torch was mounted so as to present the arc at an angle of approximately 60° to the workpiece.

The working current was set on the rectifier power unit and various workpieces were face milled using ceramic cutting tips.

TEST No. 1

| | |
|---|---|
| Work material: | Alloy steel En.40B (Hardness 280 VPN, as cast) 4 in. wide × 6 in. long |
| Cutting inserts: | 'Nippon Tungsten' NPC-A2 ceramic |
| Plasma settings: | |
| Current: | 55A |
| Voltage: | 45V |
| Power: | 2.5 kw |
| Cutter speed: | 914 rpm (1620 s.f.p.m.) |
| Torch oscillation rate: | 160 passes per min. |
| Table traverse rate: | 11 in. per min. (= 0.069 in. per torch pass) |
| Feed per tooth: | 0.004 in. |
| Depth of cut: | 0.075 in. |
| Total length of workpiece face milled satisfactorily: | 24 in. |

To contrast the result obtained above with results using conventional cold machining, Test 1 was repeated, but without plasma heating. The table traverse rate was set at 6½ in. per min. instead of 11 in. per min. The total length face milled satisfactorily was only 6 in. Also, whereas the wear on the cutting inserts was severe after cutting 6 in. without plasma heating, only slight wear had occurred by the end of the test using plasma heating.

To contrast the results obtained previously with those for the system using rotational torch movement, Test 1 was repeated but with the following differences, due in part initially to practical speed limitation of the system.

| | |
|---|---|
| Cutting inserts: | Sandvik GC315 Titanium-coated carbide |
| Plasma settings: | |
| Current: | 120A |
| Voltage: | 58V |
| Power: | 7 kw |
| Cutter speed: | 280 r.p.m. 436 s.f.p.m. |
| Plasma torch speed: | 560 passes per min (2 torches × 280 r.p.m.) |
| Table traverse rate: | 22 in./min (= 0.04 in. per torch pass) |
| Feed per tooth: | 0.03 in. |
| Depth of cut: | 0.075 in. |
| Total length of workpiece face milled satisfactorily: | 102 in. |
| Tool life: | 4.6 minutes |

Thus, superior results to conventional cold machining were achieved with both methods of plasma heating, the rotational torch being the better of the two heating systems. In both cases, the cutter was capable of further cutting, the tool wear being negligible.

TEST No. 2

This test used as workpiece an iron based alloy having a high chromium content and good abrasion resistance. The workpiece was in the form of a cast block 12" long × 6" wide with a hardness of 835 HV.

Tests carried out using an oscillating torch system resulted in the following conditions being achieved:

| | |
|---|---|
| Cutting inserts: | 'Nippon Tungsten' NPC-A2 Ceramic |
| Plasma settings: | |
| Current: | 150A |
| Voltage: | 60V |
| Power: | 9 kw |

-continued

| | |
|---|---|
| Cutter speed: | 416 r.p.m. 663 s.f.p.m. |
| Torch oscillation rate: | 120 passes per minute |
| Table travers rate: | 10 in./minute (= 0.08 in. per torch pass) |
| Feed per tooth: | 0.002 in. |
| Depth of cut: | 0.1 in. |
| Total length of workpiece face milled satisfactorily: | 36 in. |
| Corresponding tool life: | 3½ minutes |

Milling tests were then conducted using the equipment with a rotating plasma torch. Results achieved were as follows:

| | |
|---|---|
| Cutting inserts: | 'Nippon Tungsten' NPC-A2 Ceramic |
| Plasma settings: | |
| Current: | 120A |
| Voltage: | 64V |
| Power: | 7.7 kw |
| Cutter speed: | 344 r.p.m. 547 s.f.p.m. |
| Plasma torch speed: | 688 passes per minute (2 torches × 344 r.p.m.) |
| Table traverse rate: | 11 in./minute (= 0.016 per torch pass) |
| Feed per tooth: | 0.003 in. |
| Depth of cut: | 0.1 in. |
| Total length of workpiece face milled satisfactorily: | 48 in. |
| Corresponding tool life: | 4½ minutes |

Although in both cases the tool life was comparatively short, it was advantageous to mill the material much more quickly than milling conventionally at a table traverse rate of 2.5 in. per minute.

I claim:

1. A method of machining a workpiece with a cutting tool which comprises the steps of providing a heat supply means, creating relative rectilinear movement between the workpiece and an assembly of the heat supply means and the cutting tool with the heat supply means being in advance of the cutting tool, and moving the heat supply means and cutting tool in a series of substantially arcuate passes generally transversely of the workpiece with reference to said relative rectilinear movement, and controlling the speed of said arcuate movements and the intensity of the heat supply means with relation to said relative rectilinear movement to produce a substantially evenly heated and softened region of the workpiece in advance of the cutting tool which removes heated and softened workpiece material.

2. A method of machining a workpiece with a cutting tool which comprises the steps of providing a heat supply means, creating relative rectilinear movement between the workpiece and an assembly of the heat supply means and the cutting tool with the heat supply means being in advance of the cutting tool, and moving the heat supply means and cutting tool in oscillatory movements generally transversely of the workpiece with reference to the direction of said relative rectilinear movement, the path of the heat supply means being curved and controlling the speed of said oscillatory movement and the intensity of the heat supply means with relation to said rectilinear movement to produce a substantially evenly heated and softened region of the workpiece in advance of the cutting tool which removes heated and softened workpiece material.

3. The method according to claim 2 further comprising the step of clamping the workpiece to a movable bed of a machine for movement therewith and mounting the heat supply means solely for oscillatory movement across the workpiece.

4. The method according to claim 1 wherein the speed at which the heat supply means traverses the workpiece and the speed of the relative rectilinear movement are substantially constant.

5. The method according to claim 2 further comprising traversing the heat supply means beyond the edge of the workpiece prior to reversing the direction of movement thereof.

6. The method according to claim 1 in which the heat supply means traverses the workpiece at a speed related to the rectilinear speed of the workpiece such that successive traverses of the heat supply means are spaced apart at not more than 100 percent of the width of the path heated by the heat supply means.

7. The method according to claim 1 in which the heat supply means comprises a plasma torch, the torch being mounted in advance of the cutting tool or tools by a distance of up to six times the diameter of the plasma torch orifice.

8. A method of machining a workpiece with a cutting tool which comprises the steps of providing a heat supply means creating relative rectilinear movement between the workpiece and an assembly of the heat supply means and the cutting tool with the heat supply means being in advance of the cutting tool, and rotating the heat supply means and cutting tool in substantially circular paths, portions of which are arranged generally transversely of the workpiece with reference to said relative rectilinear movement, and controlling the speed of said rotational movement and the intensity of the heat supply means with relation to said rectilinear movement to produce a substantially evenly heated and softened region of the workpiece in advance of the cutting tool which removes heated and softened workpiece material.

9. The method according to claim 8 in which the heat supply means comprises at least one plasma torch, said torch being mounted for rotation with said cutting tool.

10. The method according to claim 9 further comprising mounting the plasma torch in recesses in the cutting head to minimize the distance between the plasma arc impingement point on the workpiece and a cutter of the cutting tool.

11. The method according to claim 1 further comprising providing the leading edge of the workpiece with a sacrificial portion of metal of lesser hardness than that of the workpiece itself, said portion being secured to lie flush with the workpiece surface to be cut.

12. An apparatus for machining a workpiece comprising a machine table, a cutting tool, heat supply means for bringing about relative movement between the table and an assembly of the heat supply means and the cutting tool with the heat supply means being in advance of the cutting tool, and means for moving the heat supply means and cutting tool in oscillatory motions generally transversely of the workpiece on the machine table.

13. An apparatus for machining a workpiece comprising a machine table, a cutting tool, heat supply means, means for bringing about relative movement between the table and an assembly of the heat supply means and the cutting tool with the heat supply means being in advance of the cutting tool, and means for rotating the heat supply means and cutting tool in substantially circular paths, portions of which traverse the workpiece on the machine table.

14. Apparatus according to claim 13, wherein the heat supply means is mounted in a recess in a cutting head of the machine.

15. Apparatus according to claim 12, wherein the heat supply means comprises at least one plasma arc torch.

* * * * *